No. 763,778. PATENTED JUNE 28, 1904.
A. W. MOORE.
CERTIFICATE OF DEPOSIT.
APPLICATION FILED APR. 9, 1904.

NO MODEL.

Witnesses
J. I. McDonald
Geo. K. Thayer.

Inventor
Albert W. Moore
By Howard M. Cox Atty

THE NORRIS PETERS CO., PHOTO-LITHO., WASHINGTON, D. C.

No. 763,778. Patented June 28, 1904.

UNITED STATES PATENT OFFICE.

ALBERT W. MOORE, OF CHICAGO, ILLINOIS.

CERTIFICATE OF DEPOSIT.

SPECIFICATION forming part of Letters Patent No. 763,778, dated June 28, 1904.

Application filed April 9, 1904. Serial No. 202,472. (No model.)

*To all whom it may concern:*

Be it known that I, ALBERT W. MOORE, a citizen of the United States, residing at Chicago, in the county of Cook and State of Illinois, have invented a certain new and useful Improvement in Certificates of Deposit, of which the following is a specification.

The object of my invention is to provide an improved interest-bearing certificate of deposit issued for a round sum and payable on demand to the person designated on the paper by the depositor. To illustrate the preferred form in which the paper may be issued, I have provided certain features of convenience, which will be hereinafter more particularly described.

I attain my object by means of the form illustrated in the accompanying drawing, which represents one of the constructions according to which my paper may be made.

I propose to manufacture these forms in a series of different denominations—for example, five dollars, ten dollars, twenty dollars, forty dollars, one hundred dollars, &c. The denomination of the form here illustrated is five dollars, and this amount is preferably represented in figures at $a$ and in the body of the paper at $b$. A space $c$ is provided for the date of deposit and issuance. A space $d$ is provided for the name of the depositor, and a space $e$ for the name of the payee. The signature $f$ of the banker or depositary is located beneath the body of the instrument. The body of the instrument contains words to the effect that the principal sum has been deposited with the bank, which sum will be paid to the order of the depositor upon presentation, with the provision that interest at a specified rate will be paid on said principal sum if left in the bank for a definite period after a specified date. The date $g$ when interest commences to accrue is, in the form here illustrated, April 1, 1904. If John Doe be depositor and Richard Roe payee and Bank of Security depositary, five dollars the denomination, three per cent. per annum the rate of interest, and April 1, 1904, the date when interest commences to accrue, then the body of the instrument in its illustrated form would read:

No. B. $5.00.

CHICAGO, ILL., *February 12, 1904.*

This certifies that John Doe has deposited in the Bank of Security five dollars, payable to the order of Richard Roe on the return of this certificate properly indorsed and countersigned, with interest at the rate of three (3) per cent. per annum from April 1, 1904, if left in said bank three months.

BANK OF SECURITY,
By WILLIAM COE,
*Cashier.*

The instrument therefore assures the payee that the bank has and will hold funds for the payment of this order until presented and also promises that the bank will pay interest at the rate of three per cent., commencing April 1, for any quarterly period thereafter not less than three months in length. The payee therefore will have confidence in the worth of his paper and will also have an inducement to hold the paper instead of cashing it. The date, April 1, 1904, is preferably a part of the printed form for reasons which will now be explained. I propose to divide the calendar year into a plurality of periods mainly for the purpose of facilitating the computing of interest. In the present instance I have divided the year into four quarters and propose that interest shall commence to accrue on the 1st day of January, April, July, and October. The first period will commence on the 1st of January, the second period the 1st of April, the third period the 1st of July, and the fourth period the 1st of October, and I propose that money deposited before the commencement of any interest period shall not have interest accruing thereon until the beginning of the period next following the date of deposit. For instance, if money were deposited upon February 12, 1904, interest would not commence accruing until the 1st of April, 1904, and no interest would be paid if the bank-order be cashed prior to the 1st day of July, 1904, this being the minimum three months. It will be noted, therefore, that a deposit made prior to April 1, 1904, would not begin to earn interest until April 1, which is the beginning of the second quarter. To facilitate computation, I indicate upon the face of the paper the fact that the depositor is entitled to receive an order of the second series only—that is to say, the series commencing to earn interest with the commencement of the second period. The different series are properly numbered, lettered, or colored; but it is also within my contemplation that each series may bear both a number and a color or a letter and a color. In accordance with the form here illustrated I indicate the first interest period by the letter "A," second "B," third "C," and the fourth "D." The present paper, inasmuch as it shows that it begins to earn interest on the 1st day of April, will belong to series "B," and I have therefore marked "B" on the paper at $h$. Series "B" therefore will, according to the system outlined, always commence to earn interest from the 1st day of April, and if the series is printed with a "B" the date of commencement of the corresponding period may to advantage also be printed as shown. It is probable, of course, that more than one of the "B" series will be issued by the bank, and for the purpose of identification I have therefore at $i$ provided a space for serially numbering the paper.

In this form of order the money may be paid to the depositor himself upon presentation, and in order to provide a safeguard whereby payment may be prevented in case the paper is lost or stolen from the depositor I provide a space $k$, which is intended to receive the signature of the depositor at the time of deposit. A second blank space $m$ is provided for receiving the counter-signature of the depositor, and unless the depositor's name be forged no person can cash the order until the depositor has thus countersigned it. The depositor therefore is assured that, barring forgery, his order cannot be cashed until countersigned by him.

In order to indicate both to the holder and to the cashier or paying agent how much interest has accrued, I provide a table $n$, which shows the amount of principal and interest due at any of the respective quarters. In the present instance, where the rate is three per cent. payable quarterly, the table contains the items "$5.04," "$5.07," "$5.11," &c. The cashier will know, of course, that at any time between July 1 and October 1 he is in the first paying-quarter with reference to a "B" series, the second quarter with reference to an "A" series, and so on. Similarly, any time between October 1 and January 1 is in in the first paying-quarter with reference to a "C" series, the second paying-quarter as to a "B" series, and the third paying-quarter as to an "A" series. By this means when a series "B" order of the denomination five dollars is presented for payment at any time between July 1 and October 1 the cashier can see at a glance that the payable value of the order is five dollars and four cents, and if presented between October 1 and January 1 the payable value is five dollars and seven cents, and so on. While this interest-table in connection with the series index is a great convenience and a great improvement, it is not the main invention, as will be pointed out in the claim.

Preferably at one end of the paper is located a cashier's memorandum $o$ of principal and interest, showing the amount of principal and interest due at the end of the respective quarters. The respective amounts are arranged in a column, one above the other, with the smallest amounts nearest to the central portion of the paper. This facilitates the tearing off of the end of the paper in such a manner as to remove all items from said memorandum greater than the amount which the cashier pays. The remainder, therefore, serves as a voucher or accounting device for the cashier, so that he can readily balance his accounts at the end of the day and see that the amount of cash paid out balances the amount of the vouchers.

In case the paper should be presented for payment before any interest is payable the cashier may remove the entire memorandum, to thus show him when balancing his cash at the end of the day that no interest was paid out on the order. In order to identify the removed memorandum with the original order, I provide an index $h'$ upon the memorandum corresponding to the index $h$ on the order and also provide a space $i'$ corresponding to the space $i$ upon the order. It is not necessary, however, that any portion of the cashier's memorandum be removed from the paper, for it is convenient also to provide a series of color spots or markings $p$, $q$, $r$, and $s$, corresponding to the different amounts upon the cashier's memorandum, and these may be either removed, punched, mutilated, or otherwise marked for indicating the amount paid out. In other words, a color spot—for instance, red—would be considered as typifying the first interest-period; a second color spot—say white—the second interest-period; and so on, so that if the cashier punched or otherwise marked the white color spot it would serve to show him that the amount he had paid for the paper was the amount the paper was worth at the end of the second interest-period. I also prefer to provide one or more extra spaces $u$ upon the cashier's memorandum, where may be indicated amounts of principal and interest when computed for a greater period than any provided for in the printed form.

Although the cashier's memorandum may or may not be removed in whole or in part, it is not a coupon or set of coupons in any commercial sense of the term. The memorandum has no monetary value and cannot be cashed either with or without the main body of the paper. Its loss does not impair the cash value of the paper nor defer time of payment; nor is it contemplated that the memorandum will be partially or wholly removed. On the contrary, if a series of different cashiers in different business-houses which may have accepted the paper receive the paper one after another before presentation at the bank they may (as long as they retain paper) have an account or memorandum of the amount paid out by them for the paper by placing their initial or other mark opposite that amount on the cashier's memorandum.

Preferably on the remaining extremity of the paper is a notice $t$, designating an alternative place or places where the order may be cashed. It is evident that merchants, seeing the advantage of having bank-orders cashed at their places of business, would be glad to honor such bank-orders. Of course more than one alternative place of payment may be designated, and the offerer of redemption may have his name signed or printed; but in the present instance I have provided a space $u$, where such offerer—for instance, John Smith—may sign his name. For the purpose of limiting the time during which the offerer of redemption holds himself liable I prefer to specify in said notice the time within which presentation must be made to such offerer or guarantor.

It will be noted that the signature of a person or firm at space $u$ creates a guaranty by the signer and greatly enhances the value of the paper. Inasmuch as a bank is the debtor, it may well be that the guarantor at $u$ will be a guaranty or trust or assurance company.

What I claim as new, and desire to secure by Letters Patent, is—

A certificate issued for a round principal sum, a statement that said principal sum is being held on deposit, a promise by the depositary to pay said principal sum to the order of the specified depositor, a promise by the depositary to pay interest to the holder at a specified rate, and appropriately designated spaces for the signature and counter-signature of the depositor to thereby protect the depositor from presentation by an unauthorized person.

In witness whereof I have hereunto subscribed my name in the presence of two witnesses.

ALBERT W. MOORE.

Witnesses:
E. T. HOLWAY,
J. I. McDONALD.